Patented July 22, 1941

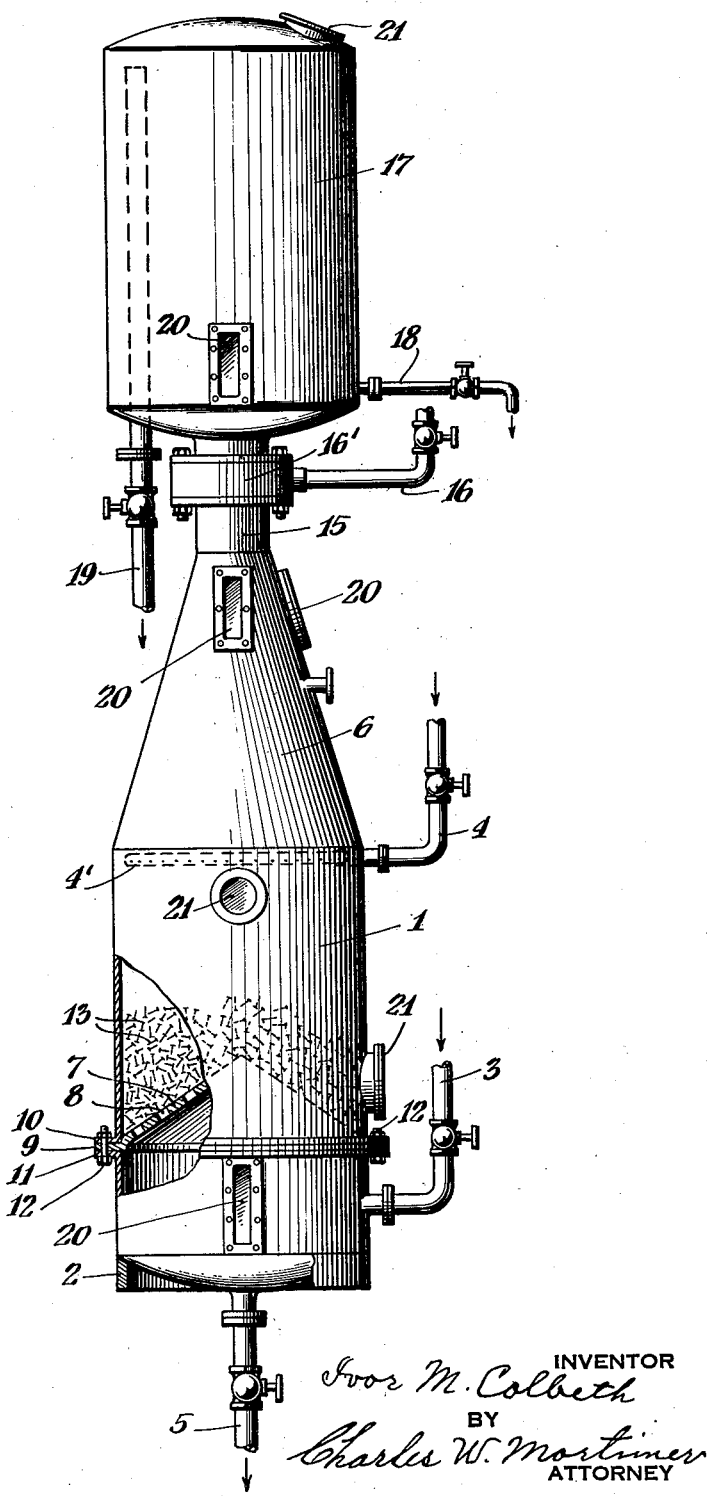

2,249,746

UNITED STATES PATENT OFFICE 2,249,746

APPARATUS FOR TREATING LIQUIDS

Ivor M. Colbeth, East Orange, N. J., assignor to The Baker Castor Oil Company, Jersey City, N. J., a corporation of New Jersey Application September 13, 1937, Serial No. 163,575

12 Claims. (Cl. 23—270.5)

This invention relates to an apparatus for treating liquids, one of which has a specific gravity different from another one. This is a continuation-in-part of my application Serial No. 94,135, filed August 4, 1936.

The invention is for apparatus that is particularly applicable to the treatment of liquids that are immiscible with each other and contain constituents which will chemically react with each other. The liquids may contain other solids in solution which discolor the same or are impurities therein. The apparatus can be operated continuously and is applicable to a large variety of situations, such as continuous esterification, continuous saponification, continuous extraction of liquids, and others.

Although the apparatus is applicable to a large number of different sorts of liquids, it is particularly suitable for purifying animal, fish and vegetable oils. It will be specifically described in connection with the purification of vegetable oils.

In using this apparatus with oil in which impurities or fatty acids are to be removed, an aqueous solution of caustic alkali is caused to move downwardly slowly while the oil is permitted to rise upwardly through it. Provision is made for dividing an incoming stream of the oil into a large number of droplets of suitable size without agitating the mixture sufficiently to cause an emulsion of oil and water to be formed even in the presence of any soap that may be formed in the process. This may be done by interposing a large number of mechanical obstructions or particles of solid matter, that are not reacted upon chemically, in the path of the rising oil, so that as the oil passes upwardly it will pass through interstices and along the surfaces of these obstructions so that it becomes retarded in its upward travel and is divided into many small droplets. A reticulated plate may be used to support the particles of solid matter and to aid in dividing the liquid into droplets.

Provision is made whereby the oil can be washed immediately after it has passed through the alkali solution by permitting it to pass upwardly through wash water which may move downwardly and dilute the alkaline solution which is used for treating the oil. Provision is also made so that the speed of the downward movement of the wash water is greater than that of the alkaline water in which the oil is treated. This is accomplished in the apparatus described below by introducing the wash water under sufficient pressure to produce the required speed to travel downwardly through the narrow and conical sections of the container. It has been found desirable to use enough wash water to dilute the alkaline water sufficiently and still have enough excess wash water flow upwardly and to provide a container in which a comparatively quiescent layer or column of oil can collect above the excess water, while any drops of water carried into this layer of oil settle out and can be withdrawn through an outlet below the oil layer with the excess wash water. The oil layer free from water can be drawn off from an outlet near the top.

An illustrative embodiment of an apparatus for carrying out the invention is indicated in the accompanying drawing, which is a side view partly in section.

In the drawing, reference character 1 indicates a chamber or container that may be mounted in any way, as for example upon a support 2, to keep it upright. A valved inlet 3 is connected to the lower portion of the chamber 1 and a valved inlet 4 is connected to a perforated ring 4' in the upper portion of the container 1. A valved outlet 5 is connected to the lower end of the chamber 1 and an extension 6 in the form of a truncated cone is provided at the upper end of this chamber.

A reticulated member such as a cone 7 or the like having perforations or holes 8 through it is located in the chamber 1 a short distance above the inlet 3. It may be provided with a flange 9 that can be clamped between flanges 10 and 11 on sections of the chamber 1 to keep this cone in place when the bolts 12 are tightened. Packing of nails 13 or other objects, that will cause the liquid that enters through the inlet 3 to be retarded and divided into small drops as it passes upwardly through the mass of nails or other objects, is located in the chamber 1 above the cone 7.

A neck 15 or portion of considerably smaller cross-section than the chamber 1 is provided at the upper end of the extension 6. A valved inlet pipe 16 for wash water enters the neck 15 tangentially through the portion 16' between its ends, and a settling or draw-off tank 17 is connected to the upper end of the neck 15. A valved outlet pipe 18 for excess water leads from the lower portion of the tank 17 and a valved outlet pipe 19 for the washed oil enters the lower portion of the tank 17 with its open upper end terminating a short distance below the upper end of this tank.

Sight glasses 20 for observation and hand holes 21 for cleaning or other purposes are provided at convenient places.

The operation of the apparatus is as follows when the invention is used specifically for removing fatty acids from castor oil.

The oil is introduced into the lower portion of the chamber 1 through the inlet 3 and an aqueous solution of sodium hydroxide or other alkali is introduced through the inlet 4 and perforated ring 4' so that it is distributed over the entire area of the container 1. The oil, being lighter than the solution, rises, while the solution descends. The incoming oil is divided into small droplets by the cone 7 and nails 13, so that the oil and solution are caused to come into intimate contact. Soap is formed by reaction of the alkali of the solution with the fatty acids of the oil. The soap that is formed is quickly dissolved in the water and carried downwardly with any unreacted alkali that may remain and out through the outlet pipe 5. The oil from which the fatty acids have been removed passes upwardly through the neck 15 into the lower portion of the tank 17.

The wash water that enters through the pipe 16 and portion 16' causes a whirling or stirring or agitation and effectively washes the rising oil and causes many of the droplets to contact and coalesce into drops of larger size which rise into the tank 17 to form a layer. The valves in the inlet water pipe 16 and outlet water pipe 18 are so regulated that enough water enters to wash the oil, part of this water passing downwardly and diluting the alkali solution entering through the pipe 4 to the proper strength, another part of this water passing upwardly and forming a layer or column of water in the bottom of tank 17 into which the drops of water that may have been carried with the washed oil into the upper layer of oil in this tank 17 settle and are drawn off through the outlet pipe 18.

The valves in the pipes 3, 4, 5, 16 and 18 are regulated in accordance with the liquids used, so that the time of contact and sort of treatment will be that which is desired, as can be ascertained by inspection through the sight glasses 20 or by examination of the liquids from the outlet pipes.

While the process is in regular operation the speed of downward movement of the wash water is a maximum at the neck 15 and is at an approximately minimum constant speed in the lower part of the extension 6 and until it reaches the nails 13, when the speed is increased while passing the nails and finally slows up beyond the nails. The speed of the oil is at a minimum through the nails as it apparently passes through the interstices and crawls along the surfaces of the nails. After it leaves the nails, it rises freely, at a speed of about 10 feet a minute. This speed is decreased farther up, due to the downward speed of the water in the neck 15. After the oil passes through this neck it rises freely at about 10 feet a minute until it coalesces to form a column in the upper portion of the apparatus. The concentration of the caustic soda is at a maximum at its point of entrance through the pipe 4 and decreases due to dilution with water and reaction with fatty acid as it progresses downward through the column. In contrast to this, the concentration of soap is at a maximum at the point of entrance of the oil through the pipe 3 located at or near the bottom of the chamber 1, and decreases as it proceeds up the column to zero or practically zero near the point where the caustic soda enters the chamber 1. The fatty acid in the oil decreases as the oil moves upwardly, being highest at the point of entrance and zero or practically zero at or near the point where the caustic enters.

The washing at the neck 15 is needed due to the fact that caustic alkali may be absorbed by the oil and carried upwardly, and it is desirable to free the oil from the caustic before allowing it to coalesce. This washing also helps to insure the complete removal of the soap from the oil. With the arrangement of apparatus described, all of the water used in washing does not necessarily pass downwards through the column but only such an amount as is needed to dilute the caustic used in the neutralization of the oil. The rest is discharged through the outlet 18 at such a rate as to maintain a suitable depth of oil in the portion 17 above the water therein to give time enough for drops of water to settle through the oil before it passes out through the outlet 19.

Many variations of the process as carried out in the apparatus may be made. For example, the chamber 1 may be made longer and a smaller amount of packing 13 used; the volume of oil that can be treated varies as the square of the diameter of the column; the speed at which the oil rises can be decreased by increasing the downward speed of the water and also by increasing the amount or decreasing the size of the packing particles 13; the amount of fatty acids left in the oil can be decreased by increasing the concentration of the caustic and also by increasing the depth and fineness of the packing; and by keeping the temperature elevated, as by heating one or more of the incoming liquids and heat-insulating the apparatus, the viscosities are decreased and the rate at which the oil can be treated is increased. The liquids may be fed to the apparatus by gravity or by pumps.

What is claimed is:

1. In apparatus of the character described, a container, means for introducing a comparatively heavy liquid into the upper portion of said container and drawing it off from the lower portion thereof, means for introducing a lighter liquid into the lower portion of said container and withdrawing it from the upper portion thereof, means comprising a bottom member having perforated surfaces sloping downwardly from a central point tending to cause said lighter liquid to pass upwardly through said container while being surrounded mainly by the descending heavier liquid, said container having an extension decreasing in cross section upwardly, and means to introduce a washing fluid into the smaller end of said extension.

2. In apparatus of the character described, a container, means for introducing a comparatively heavy liquid into the upper portion of said container and drawing it off from the lower portion thereof, means for introducing a lighter liquid into the lower portion of said container and withdrawing it from the upper portion thereof, means comprising a bottom member having perforated surfaces sloping downwardly from a central point tending to cause said lighter liquid to pass upwardly through said container while being surrounded mainly by the descending heavier liquid, said container having an extension decreasing in cross section upwardly, and means to introduce a washing fluid tangentially into the smaller end of said extension.

3. In an apparatus of the character described, a container having a compartment at the lower portion thereof, an inlet for introducing a liquid into said compartment, an outlet for withdrawing a liquid of greater specific gravity than said first named liquid from said compartment, an inlet for introducing said liquid of greater specific gravity than said first named liquid into the upper portion of said container, an extension decreasing upwardly substantially uniformly in cross section from the upper end of said container, and means for introducing wash water into the smallest portion of said extension.

4. In an apparatus of the character described, a container having a compartment at the lower portion thereof, an inlet for introducing a liquid into said compartment, an outlet for withdrawing a liquid of greater specific gravity than said first named liquid from said compartment, an inlet for introducing said liquid of greater specific gravity than said first named liquid into the upper portion of said container, an extension decreasing upwardly substantially uniformly in cross section from the upper end of said container, means for introducing wash water into the smallest portion of said extension, and a container into which the upper end of said extension leads.

5. In an apparatus of the character described, a container having a compartment at the lower portion thereof, an inlet for introducing a liquid into said compartment, an outlet for withdrawing a liquid of greater specific gravity than said first named liquid from said compartment, an inlet for introducing said liquid of greater specific gravity than said first named liquid into the upper portion of said container, an extension decreasing upwardly substantially uniformly in cross section from the upper end of said container, means for introducing wash water into the smallest portion of said extension, a container into which the upper end of said extension leads, and outlets from the upper and lower portions respectively of said container.

6. In an apparatus of the character described, a container having a compartment at the lower portion thereof, a reticulated member separating said compartment from the main portion of said container, an inlet for introducing a liquid into said compartment, an outlet for withdrawing a liquid of greater specific gravity than said first named liquid from said compartment, an inlet for introducing said liquid of greater specific gravity than said first named liquid into the upper portion of said container, an extension decreasing upwardly substantially uniformly in cross section from the upper end of said container, and means for introducing wash water into the smallest portion of said extension.

7. In an apparatus of the character described, a container having a compartment at the lower portion thereof, a conically shaped reticulated member separating said compartment from the main portion of said container, an inlet for introducing a liquid into said compartment, an outlet for withdrawing a liquid of greater specific gravity than said first named liquid from said compartment, an inlet for introducing said liquid of greater specific gravity than said first named liquid into the upper portion of said container, an extension decreasing upwardly substantially uniformly in cross section from the upper end of said container, and means for introducing wash water into the smallest portion of said extension.

8. In an apparatus of the character described, a container having a compartment at the lower portion thereof, a reticulated member separating said compartment from the main portion of said container, a pile of discrete particles of solid material on said member, an inlet for introducing a liquid into said compartment, an outlet for withdrawing a liquid of greater specific gravity than said first named liquid from said compartment, an inlet for introducting said liquid of greater specific gravity than said first named liquid into the upper portion of said container, an extension decreasing upwardly substantially uniformly in cross section from the upper end of said container, and means for introducing wash water into the smallest portion of said extension.

9. In an apparatus of the character described, a container having a compartment at the lower portion thereof, a reticulated member separating said compartment from the main portion of said container, a pile of nails on said member, an inlet for introducing a liquid into said compartment, an outlet for withdrawing a liquid of greater specific gravity than said first named liquid from said compartment, an inlet for introducing said liquid of greater specific gravity than said first named liquid into the upper portion of said container, an extension decreasing upwardly substantially uniformly in cross section from the upper end of said container, and means for introducting wash water into the smallest portion of said extension.

10. In apparatus of the character described, a container, means for introducing a comparatively heavy liquid into the upper portion of said container and drawing it off from the lower portion thereof, means for introducing a lighter liquid into the lower portion of said container and withdrawing it from the upper portion thereof, means comprising a bottom member extending over the entire cross sectional area of said container and having perforated surfaces sloping downwardly from a central point of said container tending to cause said lighter liquid to pass upwardly through said container while being surrounded mainly by the descending heavier liquid, and distribution material comprising elongated bodies having enlargements thereon carried by said bottom member.

11. In apparatus of the character described, a container, means for introducing a comparatively heavy liquid into the upper portion of said container and drawing it off from the lower portion thereof, means for introducing a lighter liquid into the lower portion of said container and withdrawing it from the upper portion thereof, means comprising a bottom member extending over the entire cross sectional area of said container and having perforated surfaces sloping downwardly from a central point of said container tending to cause said lighter liquid to pass upwardly through said container while being nurrounded mainly by the descending heaver liquid, distribution material comprising elongated bodies having enlargements thereon carried by said bottom member, said container having an extension decreasing in cross section upwardly.

12. In apparatus for chemical treatment of oils and subsequent washing of the same of the character described, a container, means for introducing a comparatively heavy liquid into the upper portion of said container and drawing it off from the lower portion thereof, means for introducing a lighter liquid into the lower portion of said container and withdrawing it from the upper portion thereof, and a plate through which said liquids pass in opposite directions, said plate being perforated throughout substantially its entire area and being located above the point of introduction of said lighter liquid and below the point of introduction of said heavy liquid, said plate being devoid of openings except for said perforations and extending in a direction having a substantial slope across the entire cross sectional area of said container.

IVOR M. COLBETH.